(12) United States Patent
Fujishiro et al.

(10) Patent No.: US 8,708,300 B2
(45) Date of Patent: Apr. 29, 2014

(54) SLIDING DEVICE FOR A VEHICLE

(75) Inventors: Shun Fujishiro, Anjo (JP); Yukifumi Yamada, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/503,527

(22) PCT Filed: Oct. 13, 2010

(86) PCT No.: PCT/JP2010/067961
§ 371 (c)(1),
(2), (4) Date: Apr. 23, 2012

(87) PCT Pub. No.: WO2011/055615
PCT Pub. Date: May 12, 2011

(65) Prior Publication Data
US 2012/0205512 A1    Aug. 16, 2012

(30) Foreign Application Priority Data
Nov. 4, 2009  (JP) ................................. 2009-253532

(51) Int. Cl.
*B60N 2/08*    (2006.01)
*B60N 2/12*    (2006.01)

(52) U.S. Cl.
USPC ........................... 248/429; 248/424; 297/341

(58) Field of Classification Search
USPC .................... 248/424, 429, 430, 423, 221.11, 248/222.13; 297/341, 344.1, 468, 473, 318, 297/342, 343
See application file for complete search history.

(56) References Cited

U.S. PATENT DOCUMENTS

| 6,286,799 | B1 * | 9/2001 | Fujii | ............................. 248/430 |
| 7,717,392 | B2 | 5/2010 | Sakakibara et al. | |
| 8,136,784 | B2 * | 3/2012 | Yamada et al. | ............... 248/424 |

(Continued)

FOREIGN PATENT DOCUMENTS

DE         100 46 204 A1    6/2002
DE    20 2007 004 524 U1    9/2008

(Continued)

OTHER PUBLICATIONS

The Extended European Search Report issued Sep. 3, 2012, in Application No. / Patent No. 10828175.9-2424 / 2497683.

(Continued)

*Primary Examiner* — Tan Le
(74) *Attorney, Agent, or Firm* — Oblon, Spivak, McClelland, Maier & Neustadt, L.L.P.

(57) ABSTRACT

A sliding device for a vehicle comprises a lock member received and attached within a section area of one of relatively movable first and second rails for locking the relative movement between the first and second rails; and a manipulation lever provided for moving the lock member to permit the relative movement between the first and second rails. A movement permitting portion is formed on at at least one of the lock member and the rail attaching the lock member so that the relative movement between the lock member and the rail attaching the lock member in the rail axis direction is allowed with the lock member locking the relative movement. Further, a movement restraining portion is formed on the rail attaching the lock member to restrain the movement in a lock release direction of the lock member after the relative movement at the movement permitting portion.

13 Claims, 12 Drawing Sheets

(56) References Cited

U.S. PATENT DOCUMENTS

| | | |
|---|---|---|
| 2008/0048476 A1* | 2/2008 | Kojima et al. ............. 297/341 |
| 2009/0218843 A1* | 9/2009 | Wojatzki et al. ........ 296/65.13 |
| 2012/0001049 A1* | 1/2012 | Selbold et al. ............. 248/429 |
| 2012/0132778 A1* | 5/2012 | Nakamura et al. ......... 248/429 |

FOREIGN PATENT DOCUMENTS

| | | |
|---|---|---|
| FR | 2 767 096 A1 | 2/1999 |
| JP | 59 58638 | 4/1984 |
| JP | 8 132934 | 5/1996 |
| JP | 2004 224273 | 8/2004 |
| JP | 2008 184033 | 8/2008 |
| JP | 2009 241919 | 10/2009 |

OTHER PUBLICATIONS

International Search Report Issued Nov. 16, 2010 in PCT/JP10/67961 Filed Oct. 13, 2010.

* cited by examiner

SLIDING DEVICE FOR A VEHICLE

TECHNOLOGICAL FIELD

The present invention relates to a sliding device for a vehicle provided with a pair of first rails fixed to a vehicle and a pair of second rails supported movably relative to the first rails and particularly, relates to a sliding device for a vehicle capable of moving a seat for the vehicle in a front-rear direction.

BACKGROUND ART

Heretofore, there has been known a sliding device for a vehicle described in Patent Document 1. The sliding device is provided with a lower rail and an upper rail which are mutually slidably engaged in a longitudinal direction, a lock member (lock lever) pivotably supported by the upper rail at about a center portion thereof and pivotally moved to be disengageably engaged with the lower rail, and a manipulation lever connected to the lock member for pivotally moving the lock member relative to the lower rail in a release direction. The lower rail takes an almost U-letter shape in section and comprises a base portion in a flat shape, vertical walls extending upward from both ends of the base portion, and flange portions turned inward and downward from upper end portions of respective vertical walls. A plurality of engaging teeth like a saw blade are formed on a lower end of each flange portion. Further, the lock member is formed at one end portion thereof with engaging holes engageable with the engaging teeth of the lower rail and is formed at the other end portion thereof with an attaching portion to which a manipulation lever is attached.

In the construction described above, when one end portion of the lock member is pivotally moved upward by a spring force to bring the engaging holes of the lock member into engagements with the engaging teeth of the lower rail, a lock state is brought about to restrain the movement of the upper rail relative to the lower rail. Further, when the one end portion of the lock member is pivotally moved downward by the manipulation of the manipulation lever to separate the engaging holes of the lock member from the engaging teeth of the lower rail, a lock release state is brought about to permit the movement of the upper rail relative to the lower rail.

PRIOR ART DOCUMENT

Patent Document

Patent Document 1: JP2008-184033 A (paragraphs [0012], [0030] and FIG. 2)

SUMMARY OF THE INVENTION

Problem to be Solved by the Invention

However, in a lock mechanism wherein, like the aforementioned prior art sliding device for the vehicle, the pivot movement of the lock member in a vertical direction brings the engaging holes of the lock member into engagements with, or disengagements from, the engaging teeth of the lower rail, an anxiety arises in that the lock release state is brought about accidentally if an excess load in the vehicle forward direction is exerted on the upper rail due to, for example, a frontal collision of the vehicle. Specifically, in the lock mechanism of this kind, a setting is made so that in an ordinary state of use, the lock state can be maintained through engagements of the engaging holes with the engaging teeth even if a load (weight) in the vehicle forward direction is exerted on the upper rail in the lock state. However, in the lock mechanism, when the excess load in the vehicle forward direction is inputted to the upper rail in the lock state, stresses are concentrated on engaging parts of the engaging teeth with the engaging holes, and there arises a fear that the engaging teeth are deformed to incline in the vehicle forward direction. This leads to an anxiety that the engaging holes slide on the inclined portions of the engaging teeth and that the engagement state of the engaging holes with the engaging teeth is released as a result of the lock member being pivotally moved about a pivot axis portion, thereby bringing about the lock release state accidentally.

The present invention has been made taking the foregoing problem into consideration, and an object thereof is to provide a sliding device for a vehicle capable of preventing the lock release of a lock member against an inputted large load in a vehicle forward direction.

Measures for Solving the Problem

In order to solve the aforementioned problem, the construction of the present invention comprises a first rail; a second rail supported relatively movably relative to the first rail in a rail axis direction; a lock member received and attached within a section area of one of the first and second rails to extend in the rail axis direction of the one rail for locking the relative movement between the first and second rails; a manipulation lever mounted to the lock member for moving the lock member to permit the relative movement between the first and second rails; a movement permitting portion formed on at least one of the lock member and the rail attaching the lock member so that the relative movement between the lock member and the rail attaching the lock member is allowed with the lock member locking the relative movement; and a movement restraining portion formed on the rail attaching the lock member to restrain the movement in a lock release direction of the lock member after the relative movement at the movement permitting portion.

FORMS FOR PRACTICING THE INVENTION

Figure 1:
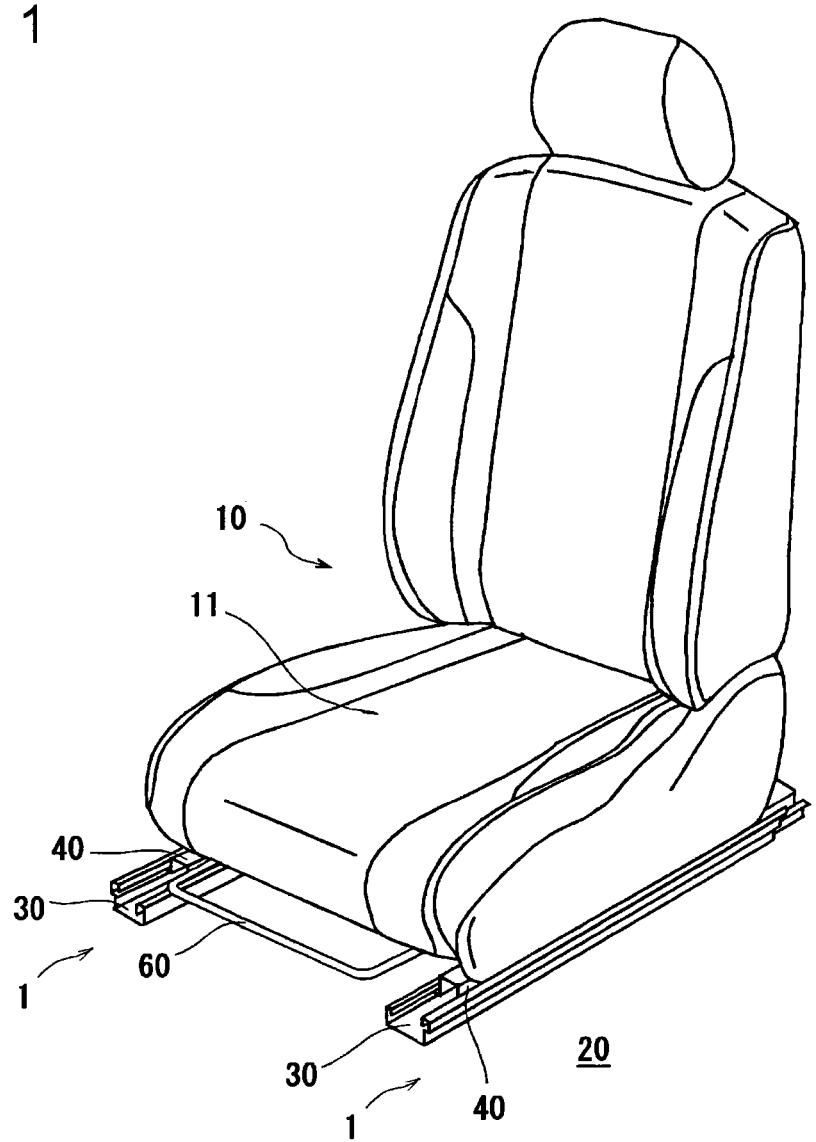
FIG. 1 is a perspective view showing a vehicle seat to which a sliding device for a vehicle in an embodiment according to the present invention is applied.
Figure 2:
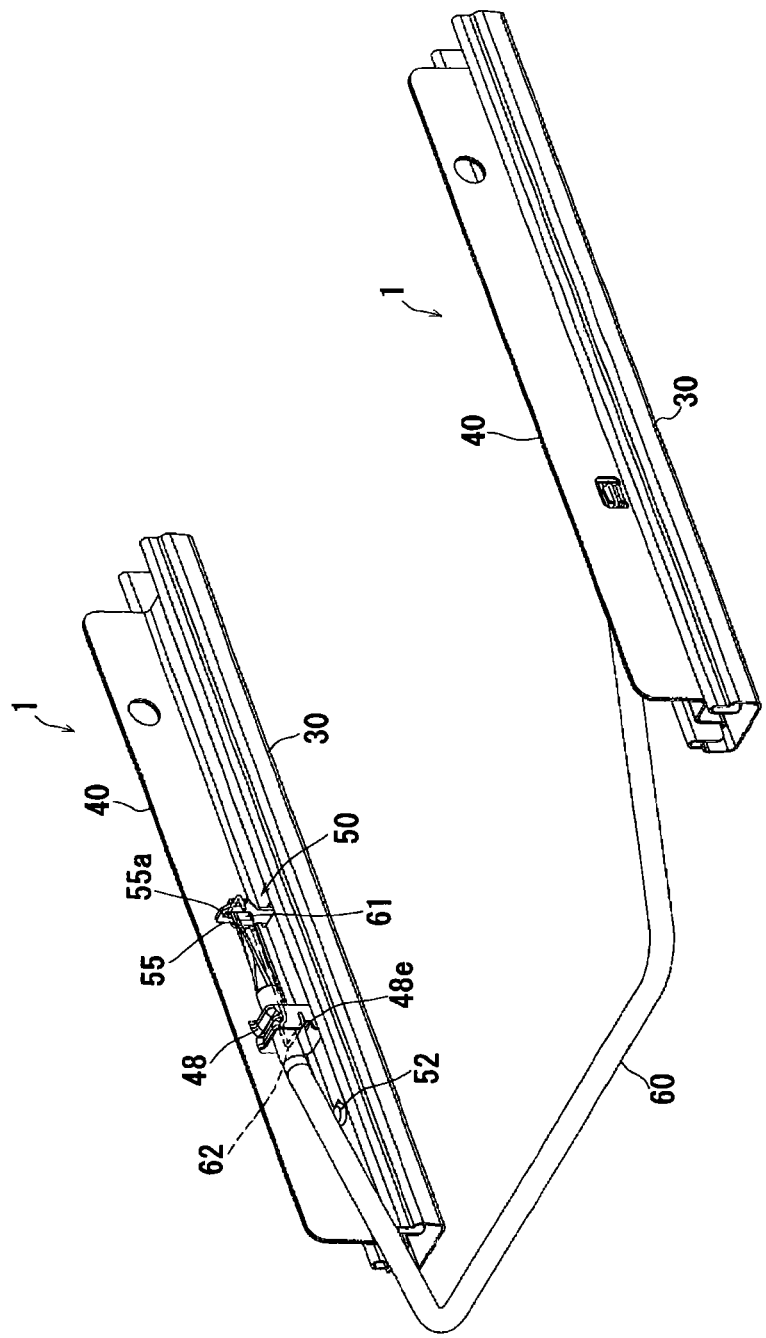
FIG. 2 is a perspective view of the sliding device for the vehicle in FIG. 1.
Figure 3:
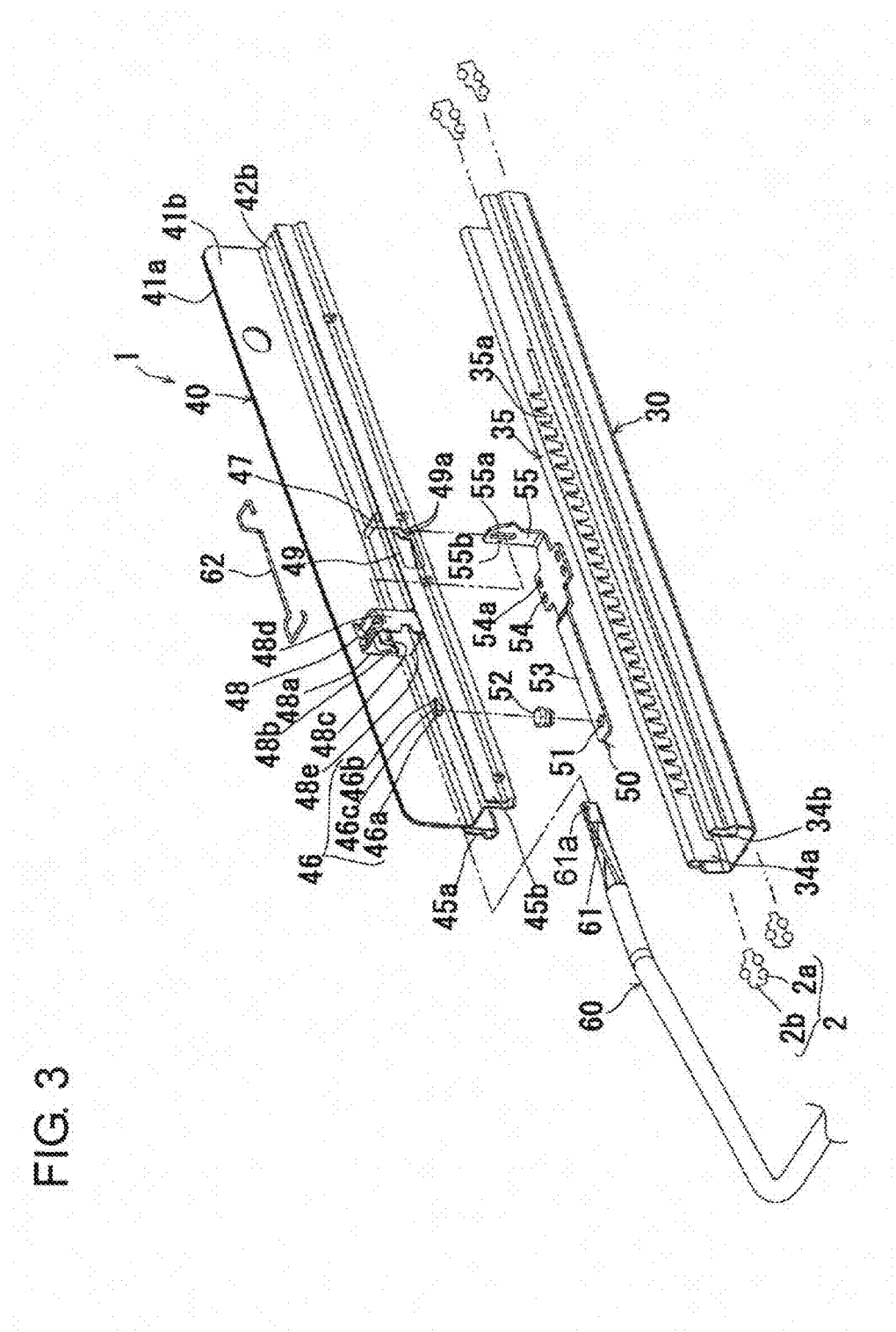
FIG. 3 is an exploded perspective view of the sliding device for the vehicle in FIG. 2.

Hereafter, an embodiment of a sliding device for a vehicle according to the present invention will be described with reference to the drawings. A "front-rear direction" referred to in the following description is based on the front-rear direction of the vehicle. As shown in FIGS. 1-3, sliding devices for a vehicle in the present embodiment are seat sliding devices 1 for moving a seat 10 relative to the vehicle in the front-rear direction, are manufactured to be generally left-right symmetrical, and are attached to lower parts on both sides of a seat cushion 11 of the seat 10. The respective seat sliding devices 1 have lower rails 30 fixed to a floor 20 of the vehicle and upper rails 40 fixed to the seat 10 side and supported to be relatively slidable relative to the lower rails 30 in a rail axis direction.

Further, as referred to later in detail, lock members 50 for locking relative movements of the lower rails 30 and the upper rails 40 are arranged between the lower rails 3 and the upper rails 40 of the left and right seat sliding devices 1. One manipulation lever 60 which protrudes forward from between the seat 10 and the floor 20 is able to release the locks by the lock members 50. Unless described to the contrary, the construction and operation will be described hereafter with respect to the seat sliding device 1 on one side.

Figure 4:
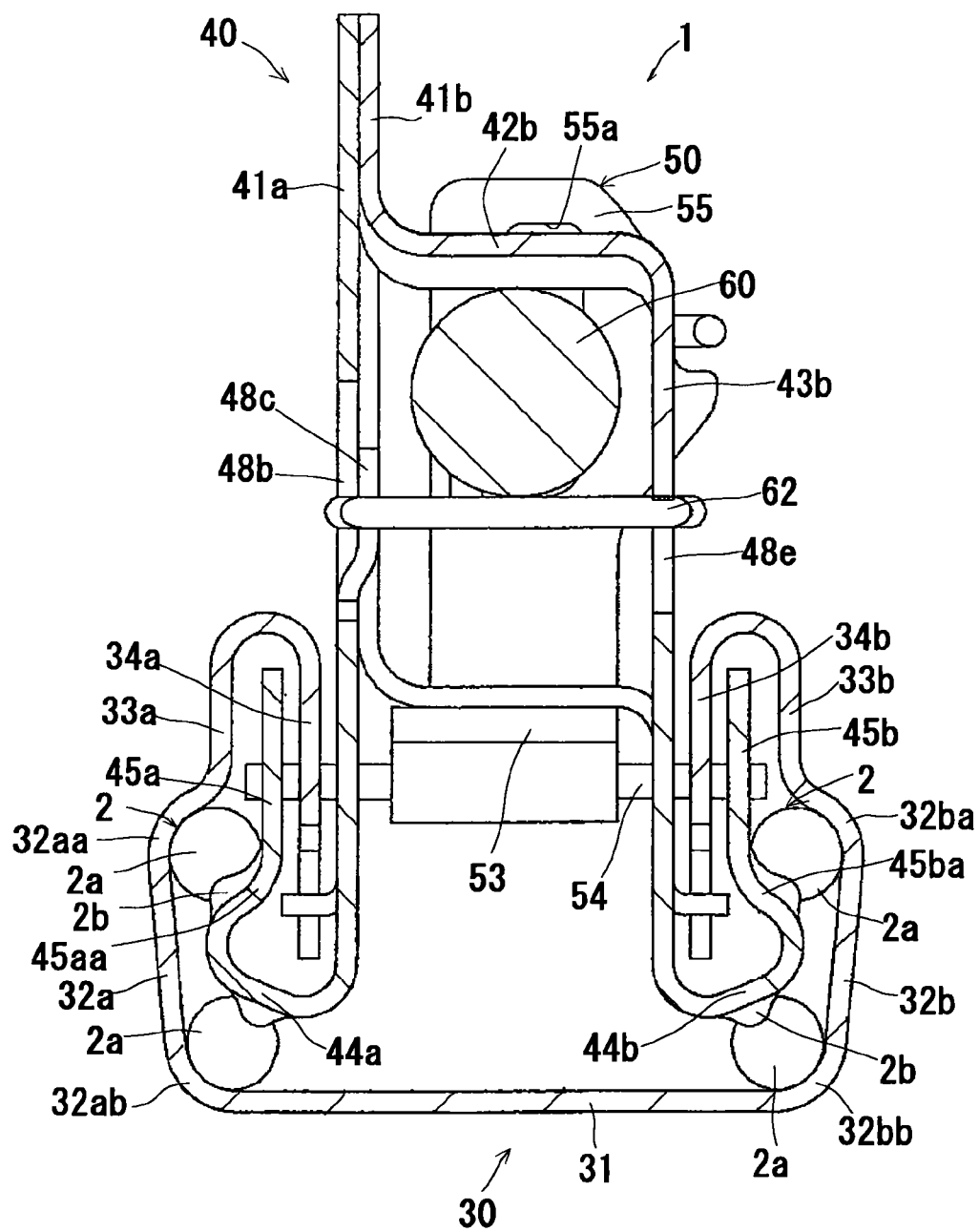
FIG. 4 is a view of a lock member of the sliding device for the vehicle in FIG. 2 taken at a part thereof and viewed from the forward side.

As shown in FIG. 4, the lower rail 30 has a base portion 31 parallel to the floor 20 of the vehicle, a first side portion 32a on the outside and a first side portion 32b on the inside which extend upward from both ends of the base portion 31 as they are curved, a second side portion 33a on the outside and a second side portion 33b on the inside curved once inward from the upper ends of both of the first side portions 32a, 32b and extending upward again, and a third side portion 34a on the outside and a third side portion 34b on the inside turned inward from the upper ends of both of the second side portions 33a, 33b and extending downward.

As shown in FIG. 3, the third side portions 34a, 34b of the lower rail 30 are formed with engaged portions 35 with which an engaging portion 54 of the lock member 50 referred to later is engaged. On each of the engaged portions 35, a plurality of cutouts 35a taking a saw-tooth shape and directed downward are provided at regular intervals in the rail axis direction over a length covering the front-rear maximum moving range of the upper rail 40.

As shown in FIG. 4, the upper rail 40 has a first hanging portion 41a on the outside extending downward toward the floor 20 of the vehicle and a first hanging portion 41b on the inside being shorter in length than the hanging portion 41a, a base plate portion 42b extending horizontally inward from the lower end of the first hanging portion 41b, a second hanging portion 43b extending downward from one end on the inside of the base plate portion 42b, a slope portion 44a on the outside and a slope portion 44b on the inside extending obliquely upward and outward from lower ends of the hanging portion 41a and the second hanging portion 43b, and a rising portion 45a on the outside and a rising portion 45b on the inside curved once inward from outside one ends of both of the slope portions 44a, 44b and extending upward.

As shown in FIG. 3, an attached portion 46 to which an attaching portion 51 of the lock member 50 is attached is formed at a forward portion in the longitudinal direction on the base plate portion 42b of the upper rail 40. The attaching portion 51 and the attached portion 46 are formed as pinholes through which an attaching pin 52 is able to pass. Further, a mounting-portion piercing opening 47 through which a mounting portion 55 of the lock member 50 passes is formed at a portion behind the attached portion 46 on the base plate portion 42b. Further, engaging-portion piercing openings 49 through which the engaging portion 54 of the lock member 50 passes are formed at portions adjacent to the mounting-portion piercing opening 47 on the hanging portion 41a, the second hanging portion 43b and both of the rising portions 45a, 45b of the upper rail 40. The attached portion 46, the mounting-portion piercing opening 47 and the engaging-portion piercing openings 49 have a function of preventing the lock member 50 from being unlocked or broken when a frontal collision encountered with the lock member 50 held in the lock state causes a large load in the vehicle forward direction inputted to the upper rail 40, and details of these will be referred to later.

Further, a lever support portion 48 which takes a square shape in section for supporting the manipulation lever 60 is provided upright between the attached portion 46 and the mounting-portion piercing opening 47 on the base plate portion 42b. The lever support portion 48 is formed by providing two parallel L-letter shape notches from a mid part on the first hanging portion 41b to an inside one end of the base plate portion 42b and by turning inward an inland part between the notches to make an inverted L-letter shape. A slit 48b of an inverted U-letter shape is formed on the outside vertical wall portion 48a (hanging portion 41a) forming the lever support portion 48. A tongue piece portion 48c on an inland side defined by the slit 48b is slightly bent inward, and a one-end side of a lever spring 62 referred to later is made to pass through a clearance defined between the tongue piece portion 48c and the vertical wall portion 48a. A vertical wall portion 48d on the inside forming the lever support portion 48 is formed with a cutout 48e on the front part thereof. One end of the lever spring 62 is securely engaged with the cutout 48e.

As shown in FIG. 4, in the lower rail 30 and the upper rail 40, the rising portions 45a, 45b of the upper rail 40 are inserted from the front side between the first side portions 32a, 32b, the second side portions 33a, 33b and the third side portions 34a, 34b of the lower rail 30. Further, ball bearings 2 are attached to be put between the inner sides of respective curved portions 32aa, 32ab, 32ba, 32bb formed at upper and lower ends of the first side portions 32a, 32b of the lower rail 30 and the outer sides of the slope portions 44a, 44b and the outer sides of curved portions 45aa, 45ba formed at lower ends of the rising portions 45a, 45b.

With this construction, a load that the upper rail 40 receives from above is born by the lower rail 30 through the ball bearings 2. Thus, the construction is such that the upper rail 40 is supported on the lower rail 30 through the rolling of balls 2a of the ball bearings 2 and is movable smoothly in the front-rear direction. Then, the upper rail 40 is supported on the lower rail 30 without having any looseness in both of the vertical and left-right directions in such a manner that in the left-right direction, the slop portions 44a, 44b of the upper rail 40 and the curved portions 45aa, 45ba formed at the lower ends of the rising portions 45a, 45b are put between the pairs of ball bearings 2 located at both of the outer sides and that in the vertical direction, the slope portions 44a, 44b and the curved portions 45aa, 45ba formed at the lower ends of the rising portions 45a, 45b are put between the balls 2a retained in holders 2b of the respective ball bearings 2.

As shown in FIG. 3, the lock member 50 is made of an elastic material such as spring steel plate or the like and has the attaching portion 51, a body portion 53, the engaging portion 54, and the mounting portion 55 which are formed bodily. The lock member 50 is formed to be receivable in a section area of an inverted U-letter shape which is defined by the hanging portion 41a, the first hanging portion 41b and the base plate portion 42b of the upper rail 40. The body portion 53 is formed to take an almost rectangular plate shape that is narrower in width than the inner width of the base plate portion 42b of the upper rail 40 and that extends in length from the attached portion 46 to the mounting-portion piercing opening 47 in the rail axis direction. The attached portion 51 is a round pinhole for the attaching pin 52 to be pierceable through and is formed on a forward end side of the body portion 53.

The engaging portion 54 takes an almost rectangular plate shape that is wider in width than the outside width of the base plate portion 42b of the upper rail 40 and that is shorter in length than the horizontal width of the engaging-portion piercing openings 49 of the upper rail 40, that is, a shape that protrudes from the engaging-portion piercing openings 49 without contacting the edges of the engaging-portion piercing openings 49 and is provided on an end side behind the body portion 51. On each of both left and right sides of the engaging portion 54, a plurality (two in the embodiment) of elongate holes 54a which are engageable with the cutouts 35a of the engaged portion 35 of the lower rail 30 are provided at the same interval as the cutouts 35a in the rail axis direction.

The mounting portion 55 extends upward on the end side behind the engaging portion 54 to have the same width as the body portion 53 and takes an almost rectangular plate shape that protrudes from the mounting-portion piercing opening 47 to almost the same height as the lever support portion 48 without contacting the edge of the mounting-portion piercing opening 47. The mounting portion 55 is formed with a vertically oriented elongate hole 55a for an oblong-section portion 61 of the manipulation lever 60 to be inserted and fixed therein. Further, a cutout 55b in which the lever spring 62 is fitted is formed at an outer side of the mounting portion 55.

The lock member 50 of the construction like this is arranged beneath the base plate portion 42b of the upper rail 40, wherein the engaging portion 54 passes through the engaging-portion piercing openings 49 and wherein the mounting portion 55 passes through the mounting-portion piercing opening 47. Then, the attaching pin 52 is made to pass through the attaching portion 51 of the lock member 50 and the attached portion 46 of the upper rail 40 and is calked, so that the lock member 50 is fixedly attached to the lower surface of the base plate portion 42b of the upper rail 40. The lock member 50 made of the elastic material is formed to such a shape that it lifts up the engaging portion 54 about the attaching portion 51 as fulcrum by means of its elastic return force. Here, a bending of a Z-shape is made between the engaging portion 54 and the body portion 53 so that the engaging portion 54 of the lock member 50 is placed in parallel to the body portion 53 below the body portion 53. Thus, even when the upper surface of the body portion 53 of the lock member 50 is in contact with the lower surface of the base plate portion 42b of the upper rail 40, all of the elongate holes 54a at the engaging portion 54 of the lock member 50 reliably enter the roots of the cutouts 35 of the engaged portion 35 of the lower rail 30, whereby the engaging portion 54 and the engaged portion 35 are engaged in contact with each other not to have a clearance in the front-rear direction.

The manipulation lever 60 is made of a pipe material to take an almost U-letter shape, and each rear end of both side portions extending rearward is formed by being squashed to an oblong-section portion 61 which is longer in the vertical direction for a higher rigidity against a bending in the vertical direction. A notch portion 61a is provided on an upper surface at the vicinity to the rear end of each oblong-section portion 61. The manipulation lever 60 is attached to lever support portion 48 of the upper rail 40 and the mounting portion 55 of the lock member 50 by using the lever spring 62. The lever spring 62 is made by bending a wire rod, wherein a front portion is once bent outward and has a front end bent to an almost U-letter shape, while a rear portion is once bent upward and has a rear end bent to an almost U-letter shape.

When the manipulation lever 60 is mounted to the upper rail 40 and the lock member 50, first the U-letter shape portion at the front end of the lever spring 62 is securely engaged from the cutout 48e to the clearance between the tongue piece portion 48c and the vertical wall portion 48a, while the U-letter shape portion at the rear end of the lever spring 62 is securely engaged from the cutout 55b formed at the outside portion to the inside portion of the mounting portion 55 of the lock member 50 which protrudes from the mounting-portion piercing opening 47. Then, the rear end portion of the oblong-section portion 61 of the manipulation lever 60 is inserted into the lever support portion 48 from the side over the front end of the lever spring 62 engaged with the lever support portion 48.

Then, the U-letter shape portion at the rear end of the lever spring 62 is once disengaged from the cutout 55b on the mounting portion 55 of the lock member 50 and is lifted up, in which state the rear end portion of the oblong-section portion 61 is inserted into the elongate hole 55a at the mounting portion 55 of the lock member 50 to be let go under the rear end of the lever spring 62. Then, the U-letter shape portion at the rear end of the lever spring 62 is securely engaged with the cutout 55b on the mounting portion 55 of the lock member 50 and the notch portion 61a of the oblong-section portion 61. As a result, the state shown in FIG. 2 is reached, wherein the forward-rearward movement of the manipulation lever 60 is obstructed, whereby the manipulation lever 60 can be prevented from coming off and whereby the manipulation lever 60 and the lock member 50 are enabled to be pivotally moved bodily.

Figure 5A:
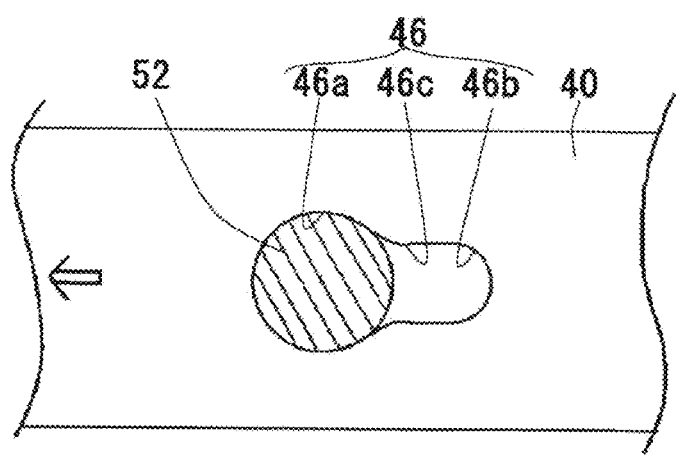
FIG. 5(A) is a view showing the state before the deformation of an attached portion which is formed on an upper rail of the sliding device for the vehicle in FIG. 2, and [FIG. 5(B)] is a view showing the state after the deformation of the attached portion.

With reference to the drawings, description will be made regarding the attached portion 46, the mounting-portion piercing opening 47 and the engaging-portion piercing openings 49 which are formed on the upper rail 40. As shown in FIG. 5(A), the attached portion 46 is formed to a shape that has an attaching hole 46a being somewhat larger in diameter than the outer diameter of the attaching pin 52 and a small hole 46b (corresponding to "movement permitting portion" in the present invention) of a small diameter which is juxtaposed to communicate with a rearward center portion of the attaching hole 46a through a communication portion 46c (corresponding to "movement permitting portion" in the present invention). As described later in detail, the small hole 46b and the communication portion 46c enable the lock member 50 and the upper rail 40 to move relatively in the rail axis direction when a frontal collision encountered with the lock member 50 held in the lock state causes a large load to be inputted to the upper rail 40 in the vehicle forward direction.

Figure 6A:
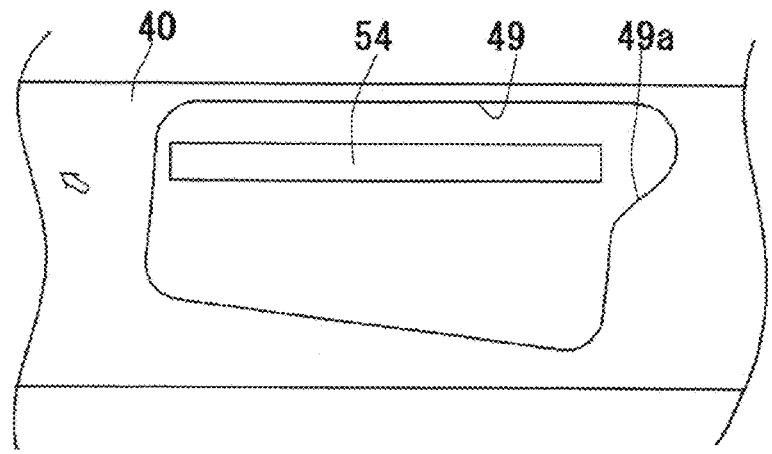
FIG. 6(A) is a view showing the state before the deformation of an engaging-portion piercing opening formed on the upper rail of the sliding device for the vehicle in FIG. 2, [FIG. 6(B)] is a view showing an intermediate state in the deformation of the engaging-portion piercing opening, and [FIG. 6(C)] is a view showing a final state in the deformation of the engaging-portion piercing opening.

As shown in FIG. 6(A), each engaging-portion piercing opening 49 is formed to an almost rectangular shape having a width which is wider than the length of the engaging portion 54 in the rail axis direction so that at the time of an insertion, the engaging portion 54 of the lock member 50 does not contact the opening edge portion of the opening 49. Then, an oblique portion 49a (corresponding to "movement restraining portion" in the present invention) is formed at a lower part on a rearward side portion of the engaging-portion piercing opening 49. The oblique portion 49a is formed so that at the time of relative movement of the lock member 50 and the upper rail 40, it can contact a rear part of the engaging portion 54 of the lock member 50 and can lift up the contacted engaging portion 54 rearward and obliquely above. As described later in detail, it becomes possible for the oblique portion 49a to restrain the lock member 50 from moving in a lock release direction after the relative movement at the aforementioned movement permitting portion.

Figure 7A:
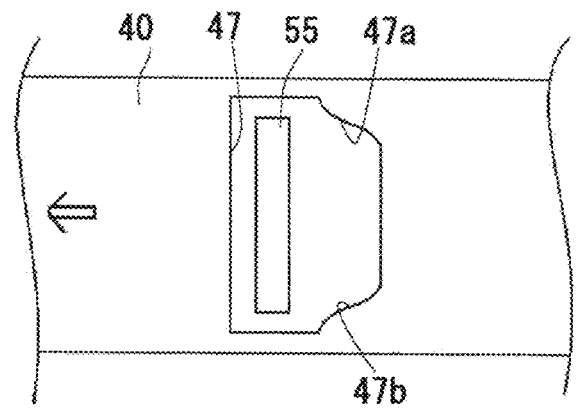
FIG. 7(A) is a view showing the state before the deformation of a mounting-portion piercing opening formed on the upper rail of the sliding device for the vehicle in FIG. 2, and [FIG. 7(B)] is a view showing the state after the deformation of the mounting-portion piercing opening.

As shown in FIG. 7(A), the mounting-portion piercing opening 47 is formed to an almost rectangular shape that has a wider width than the length of the mounting portion 55 in a direction orthogonal to the rail axis direction so that when inserted, the mounting portion 55 of the lock member 50 does not contact the opening edge portion of the opening 47. Then, at both rearward side portions of the opening 47, there are formed narrowing portions 47a, 47b (corresponding "movement restraining portion" in the present invention) that gradually narrow the width of the mounting-portion piercing opening 47 so that they can contact the both side portions of the mounting portion 55 at the time of the relative movement of the lock member 50 and the upper rail 40 as described later. As described later in detail, it is possible for the narrowing portions 47a, 47b to restrain the movement of the lock member 50 in the lock release direction after the relative movement at the aforementioned movement permitting portion.

Here, by forming on the upper rail 40 a combination of the attached portion 46 that has the small hole 46b and the communication portion 46c, and the engaging-portion piercing openings 49 that each have the oblique portion 49a or a combination of the attached portion 46 that has the small hole 46b and the communication portion 46c, and the mounting-portion piercing opening 47 that has the narrowing portions 47a, 47b, it can be sufficiently prevented that the lock member 50 is brought into the lock release or is broken when a frontal collision encountered with the lock member 50 held in the lock state causes a large load inputted to the upper rail 40 in the vehicle forward direction. By forming a combination of the attached portion 46 that has the small hole 46b and the communication portion 46c, the engaging-portion piercing openings 49 that each have the oblique portion 49a, and the mounting-portion piercing opening 47 that has the narrowing portions 47a, 47b, it becomes possible to prevent the lock release or the breakage of the lock member 50 further reliably.

The operation of the seat sliding device 1 will be described hereinafter. When the seat sliding device 1 having been assembled to the seat 10 is in the lock state, the engaging portion 54 of the lock member 50 is in engagement with the engaged portions 35 of the lower rail 30 thanks to the elastic return force of the lock member 50. When in this lock state, the passenger manipulates the front end portion of the manipulation lever 60 to raise the front end portion against the elastic return force of the lock member 50, the manipulation lever 60 is pivotally moved about the lever support portion 48 on the upper rail 40 clockwise as viewed in FIG. 2, and at the same time, the rear end portion of the oblong-section portion 61 of the manipulation lever 60 presses on the lower end portion in the elongate hole 55a of the mounting portion 55 of the lock member 50.

Thus, the lock member 50 is pivotally moved about the attached portion 46 of the upper rail 40 clockwise as viewed in FIG. 2, and the engaging portion 54 of the lock member 50 is released from the engaged portions 35 of the lower rail 30 to turn to the lock release state. Therefore, the passenger can move the seat 10 to a desired front-rear position. Then, when the passenger releases the manipulation lever 60 from his hand, the manipulation lever 60 returns to the original position thanks to the elastic return force of the lock member 50, and the engaging member 54 of the lock member 50 is engaged with the engaged portions 35 of the lower rail 30 to turn to the lock state.

At the time of an ordinary use, the load that is produced by the weights of the passenger and the seat 10 and their inertias in the front-rear direction is exerted on the attaching pin 52 through the lock member 50 and is born by the upper rail 40. When a frontal collision is encountered to cause a large load in the vehicle front-rear direction to be inputted to the upper rail 40, to the contrary, the operation will be made as described below. Where the upper rail 40 is formed with the combination of the attached portion 46 that has the small hole 46b and the communication hole 46c, and the engaging-portion piercing openings 49 that each have the oblique portion 49a, the upper rail 40 applies the forward load as shown in FIG. 5(A) to the attaching pin 52 that passes through the attaching hole 46a at the attached portion 46 of the upper rail 40.

Figure 5B:
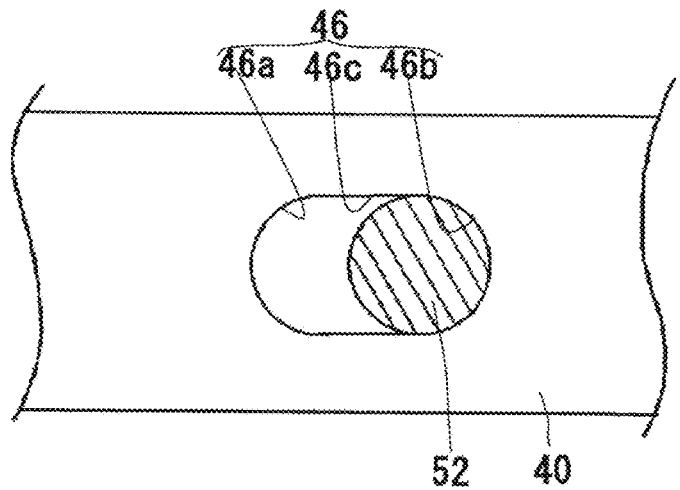

Then, as shown in FIG. 5(B), the attaching pin 52 receiving the aforementioned load deforms the communication portion 46c and the small hole 46b at the attached portion 46 and enters the deformed portion, whereby the upper rail 40 moves forward. At this time, since the lock member 50 has been secured with the engaging portion 54 being in engagement with the engaged portions 35 of the lower rail 30, the upper rail 40 relatively moves forward relative to the lock member 50. It is to be noted that the communication portion 46c and the small hole 46b at the attached portion 46 are set to complete their deformations by the force of the half or so of an estimated strength of the lock member 50.

Figure 6B:
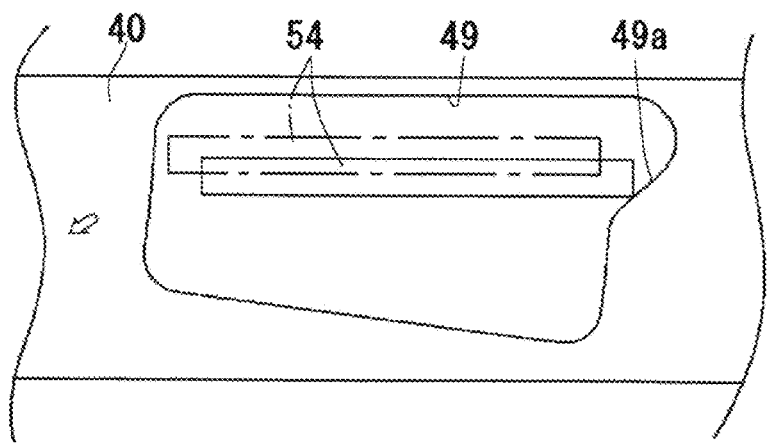
Figure 6C:
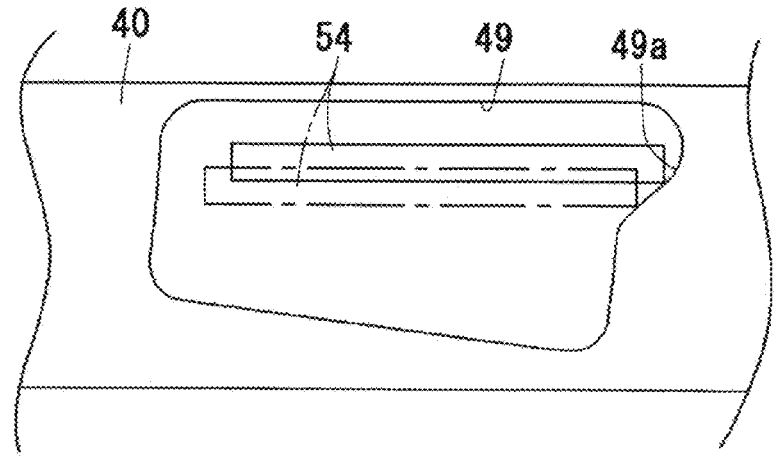

With the relative movement of the upper rail 40 relative to the lock member 50, the engaging-portion piercing openings 49 of the upper rail 40 which have the engaging portion 54 of the lock member 54 pass therethrough as shown in FIG. 6(A), slightly rise forward and obliquely above as shown in FIG. 6(B), bring the lower part areas of the oblique portions 49a of the engaging-portion piercing openings 49 into contact with the rear end portions of the engaging portion 54, and then slightly go down forward and obliquely below as shown in FIG. 6(C), so that the engaging-portion piercing openings 49 are moved as they rub the oblique portions 49a against the rear end portions of the engaging portion 54. Thereafter, because it finally results that the rear end portions of the engaging portion 54 are caught to be positioned at around an upper portion of the oblique portions 49a of the engaging-portion piercing openings 49, the downward movement of the engaging portion 54 is prevented by the oblique portions 49a, whereby the engaging portion 54 can be maintained in the state that it is engaged with the engaged portions 35 of the lower rail 30.

Figure 7B:
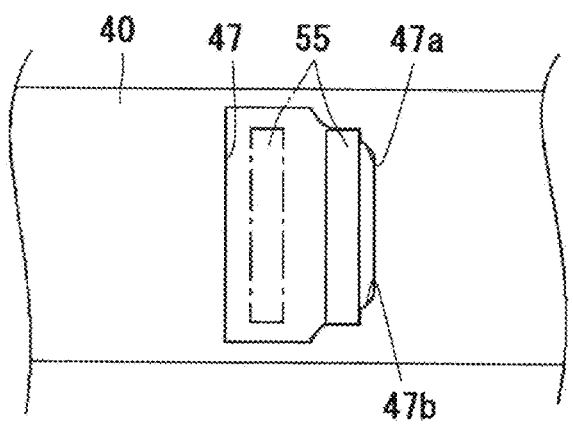

That is, it becomes realized to stably hold the state that the lock member 50 is restrained from moving in the lock release direction and that the relative movement between the lower rail 30 and the upper rail 40 is locked against the inputted large load in the vehicle forward direction. Further, the elongate holes 54a of the engaging portion 54 of the lock member 50 are held engaged to reach the roots of the cutouts 35a of the engaged portions 35 of the lower rail 30, in which the breakage mode in the aforementioned load becomes pure shear, so that a stable lock strength can be ensured.

Where the upper rail 40 is formed with the combination of the attached portion 46 that has the small hole 46b and the communication portion 46c, and the mounting-portion piercing opening 47 that has the narrowing portions 47a, 47b, the attached portion 46 operates in the same manner as the operation having been described with reference to FIG. 5(B). Then, with the relative movement of the upper rail 40 relative to the lock member 50, the mounting-portion piercing opening 47 of the upper rail 40 through which the mounting portion 55 passes as shown in FIG. 7(A) moves forward and moves as the narrowing portions 47a, 47b of the mounting-portion piercing opening 47 are cut in contact with the both side portions of the mounting portion 55, as shown in FIG. 7(B).

Then, since it finally results that the both side portions of the mounting portion 55 are frictionally engaged to be at a mid area on the narrowing portions 47a, 47b of the mounting-portion piercing opening 47, the downward movement of the mounting portion 55 is obstructed by the narrowing portions 47a, 47b, whereby the engaging portion 54 can be held in the state of being engaged with the engaged portions 35 of the lower rail 30. That is, it becomes realized to stably hold the state that the lock member 50 is restrained from moving in the lock release direction and that the relative movement between the lower rail 30 and the upper rail 40 is locked against the inputted large load in the vehicle forward direction. Further, the elongate holes 54a of the engaging portion 54 of the lock member 50 are held engaged to reach the roots of the cutouts 35a of the engaged portions 35 of the lower rail 30, in which the breakage mode in the aforementioned load becomes pure shear, so that a stable lock strength can be ensured.

Figure 8:
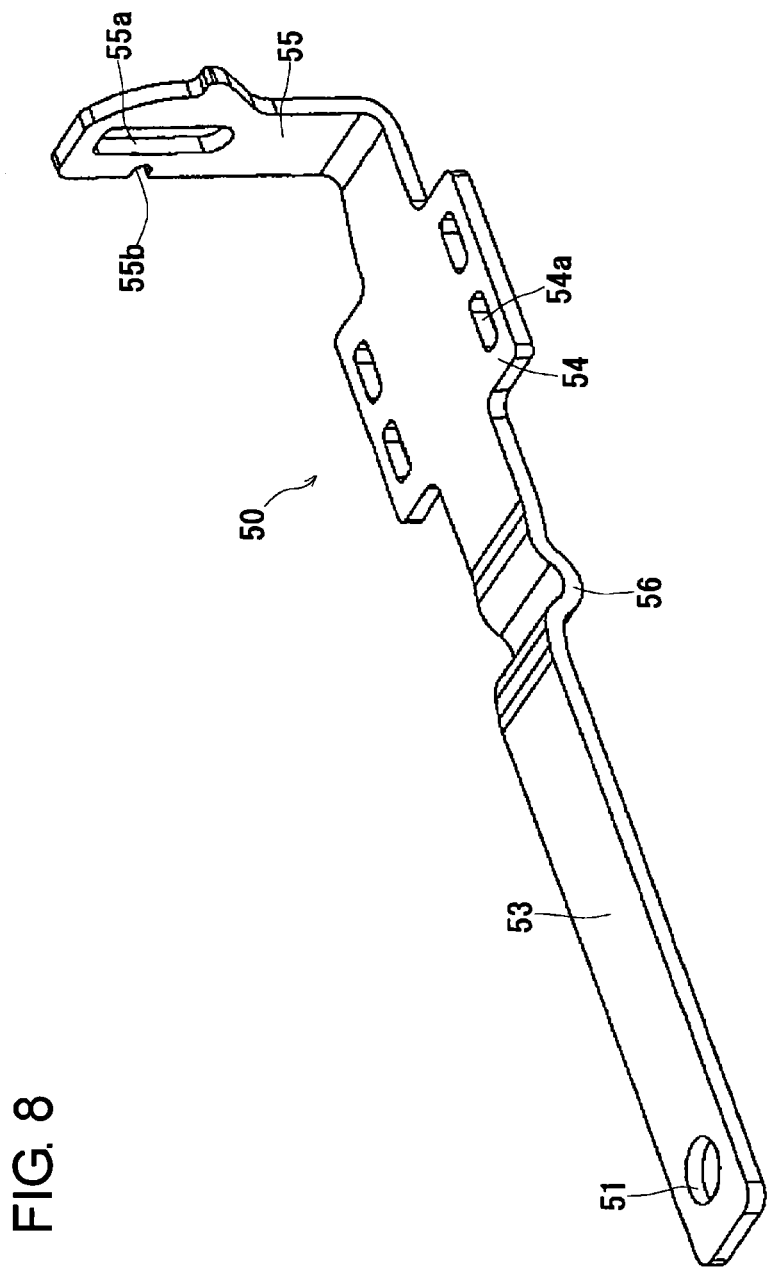
FIG. 8 is a perspective view showing a first modified form of the lock member of the seat sliding device for the vehicle in FIG. 2.

In the foregoing embodiment, the movement permitting portion is formed at the attached portion 46 of the upper rail 40. However, the movement permitting portion may not be formed at the attached portion 46, and instead, a movement permitting portion may be formed on the body portion 53 of the lock member 50, as shown in FIG. 8. Specifically, a curved portion 56 (corresponding to "movement permitting portion" in the present invention) is formed by downwardly bending a portion between the attaching portion 51 and the engaging portion 54 of the lock member 50 in the form of an arc. In this case, by taking a combination of forming the lock member 50 with the curved portion 56 and forming the upper rail 40 with the engaging-portion piercing openings 49 each having the oblique portion 49a or with the mounting-portion piercing opening 47 having the narrowing portions 47a, 47b, it can be sufficiently prevented that the lock member 50 is brought into the lock release or is broken when a frontal collision encountered with the lock member 50 held in the lock state causes a large load in the vehicle forward direction to be inputted to the upper rail 40. By forming a combination of the lock member 50 formed with the curved portion 56, the engaging-portion piercing openings 49 having the oblique portions 49a and the mounting-portion piercing opening 47 having the narrowing portions 47a, 47b, it becomes possible to prevent the lock release or the breakage of the lock member 50 further reliably.

Figure 9A:
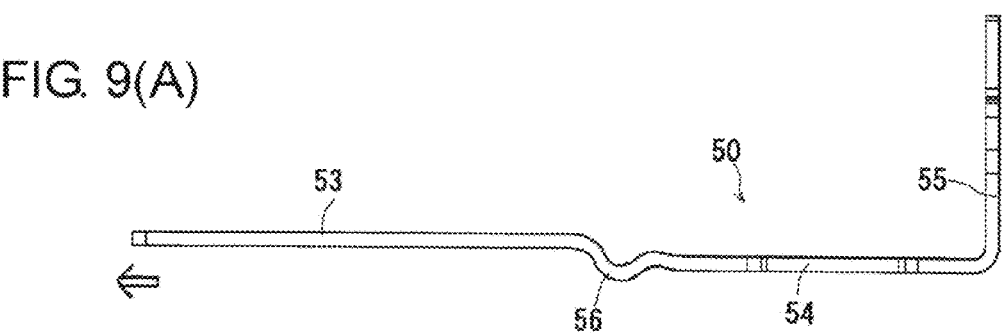
FIG. 9(A) is a view showing the state before the deformation of the lock member in FIG. 8, and [FIG. 9(B)] is a view showing the state after the deformation of the lock member.
Figure 9B:
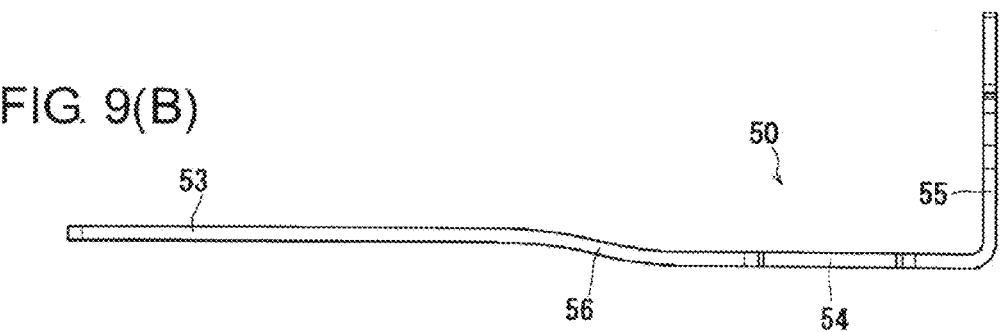

In the case of a combination that the lock member 50 is formed with the curved portion 56 and that the upper rail 40 is formed with the engaging-portion piercing openings 49 having the oblique portions 49a or the mounting-portion piercing opening 47 having the narrowing portions 47a, 47b, the operation will be performed as described hereafter when a frontal collision encountered causes a large load in the vehicle forward direction to be inputted to the upper rail 40. The upper rail 40 exerts a forward load on the attaching pin 52 which is inserted in the attached portion 46 of the upper rail 40. At this time, since the lock member 50 has been secured with the engaging portion 54 engaged with the engaged portions 35 of the lower rail 30, as shown in FIGS. 9(A) and 9(B), the body portion 53 of the lock member 50 is pulled forward by the attaching pin 52 receiving the aforementioned load, and the curved portion 56 is deformed to be stretched, whereby the upper rail 40 moves forward.

At this time, since the lock member 50 has been secured with the engaging portion 54 engaged with the engaged portions 35 of the lower rail 30, the upper rail 40 moves forward relative to the lock member 50. It is to be noted that the curved portion 56 is set to complete its deformation by the force of the half or so of the estimated strength of the lock member 50. Thereafter, the operation is performed as having been described with reference to FIGS. 6(A)-6(C) and 7(A)-7(B), whereby it becomes realized to stably hold the state that the lock member 50 is restrained from moving in the lock release direction and that the relative movement between the lower rail 30 and the upper rail 40 is locked against the inputted large load in the vehicle forward direction. Further, the elongate holes 54a of the engaging portion 54 of the lock member 50 are held engaged to reach the roots of the cutouts 35a of the engaged portions 35 of the lower rail 30, in which the breakage mode in the aforementioned load becomes pure shear, so that a stable lock strength can be ensured.

Figure 10A:
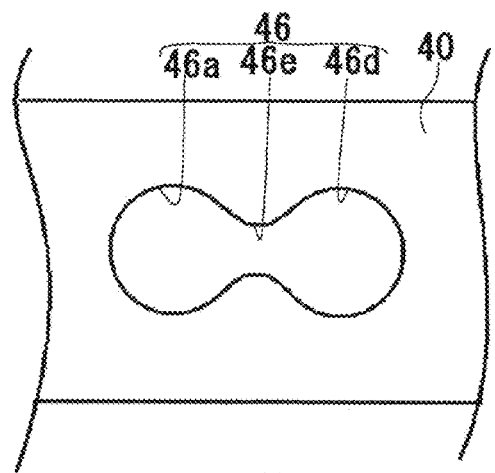
FIGS. 10(A)-10(C) are views showing first to third modified forms of the attached portion formed on the upper rail of the sliding device for the vehicle in FIG. 2.
Figure 10B:
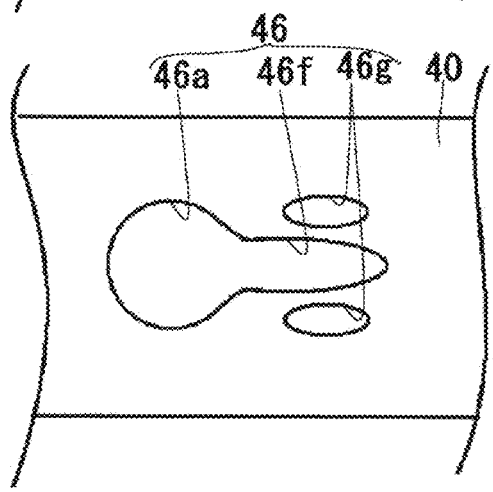
Figure 10C:
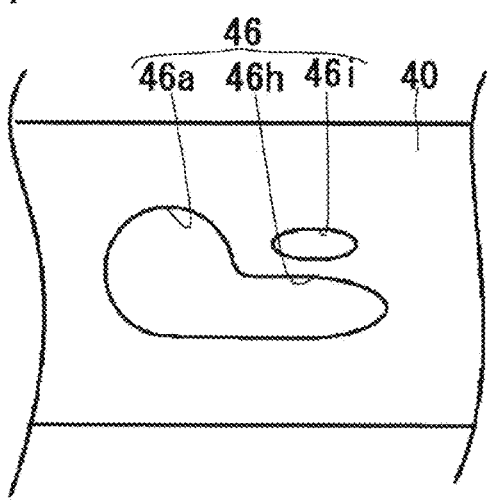

FIGS. 10(A) through (C) show modified forms of the movement permitting portion formed at the attached portion 46 of the upper rail 40. As shown in FIG. 10(A), the attached portion 46 is formed to a shape that has an attaching hole 46a being slightly larger than the outer diameter of the attaching pin 52, an escape hole 46d (corresponding to "movement permitting portion" in the present invention) juxtaposed with a space from the attaching hole 46a and being the same as the attaching hole 46a in diameter, and a communication portion 46e (corresponding to "movement permitting portion" in the present invention) making the attaching hole 46a and the escape hole 46d communicate with each other. When the upper rail 40 exerts a forward load on the attaching pin 52 which is inserted into the attaching hole 46a at the attached portion 46 of the upper rail 40, the communication portion 46e at the attached portion 46 is deformed to permit the attaching pin 52 to enter the escape hole 46d through the deformed portion, whereby it results that the upper rail 40 is relatively moved forward relative to the lock member 50. It is to be noted that the communication portion 46e of the attached portion 46 is set to complete its deformation by the force of the half or so of the estimated strength of the lock member 50.

As shown in FIG. 10(B), the attached portion 46 is formed to a shape that has an attaching hole 46a being slightly larger in diameter than the outer diameter of the attaching pin 52, an elongate hole 46f (corresponding to "movement permitting portion" in the present invention) provided to extend rearward from a rear center portion of the attaching hole 46a, and two elliptical holes 46g (corresponding to "movement permitting portion" in the present invention) provided on upper and lower sides of the elongate hole 46f. When the upper rail 40 exerts a forward load on the attaching pin 52 which is inserted into the attaching hole 46a at the attached portion 46 of the upper rail 40, the elongate hole 46f at the attached portion 46 is deformed toward the two elliptical holes 46g sides and permits the attaching pin 52 to enter the deformed portion, whereby it results that the upper rail 40 is relatively moved forward relative to the lock member 50. It is to be noted that the elongate hole 46f at the attached portion 46 is set to complete its deformation by the force of the half or so of the estimated strength of the lock member 50.

As shown in FIG. 10(C), the attached portion 46 is formed to a shape that has an attaching hole 46a being slightly larger in diameter than the outer diameter of the attaching pin 52, an elongate hole 46h (corresponding to "movement permitting portion" in the present invention) provided to extend rearward from a rear lower-side portion of the attaching hole 46a, and an elliptical hole 46i (corresponding to "movement permitting portion" in the present invention) provided on an upper side of the elongate hole 46h. When the upper rail 40 exerts a forward load on the attaching pin 52 which is inserted into the attaching hole 46a at the attached portion 46 of the upper rail 40, the elongate hole 46h at the attached portion 46 is deformed toward the elliptical hole 46i side and permits the attaching pin 52 to enter the deformed portion, whereby it results that the upper rail 40 relatively moves forward relative to the lock member 50. It is to be noted that the elongate hole 46h at the attached portion 46 is set to complete its deformation by the force of the half or so of the estimated strength of the lock member 50.

Figure 11:
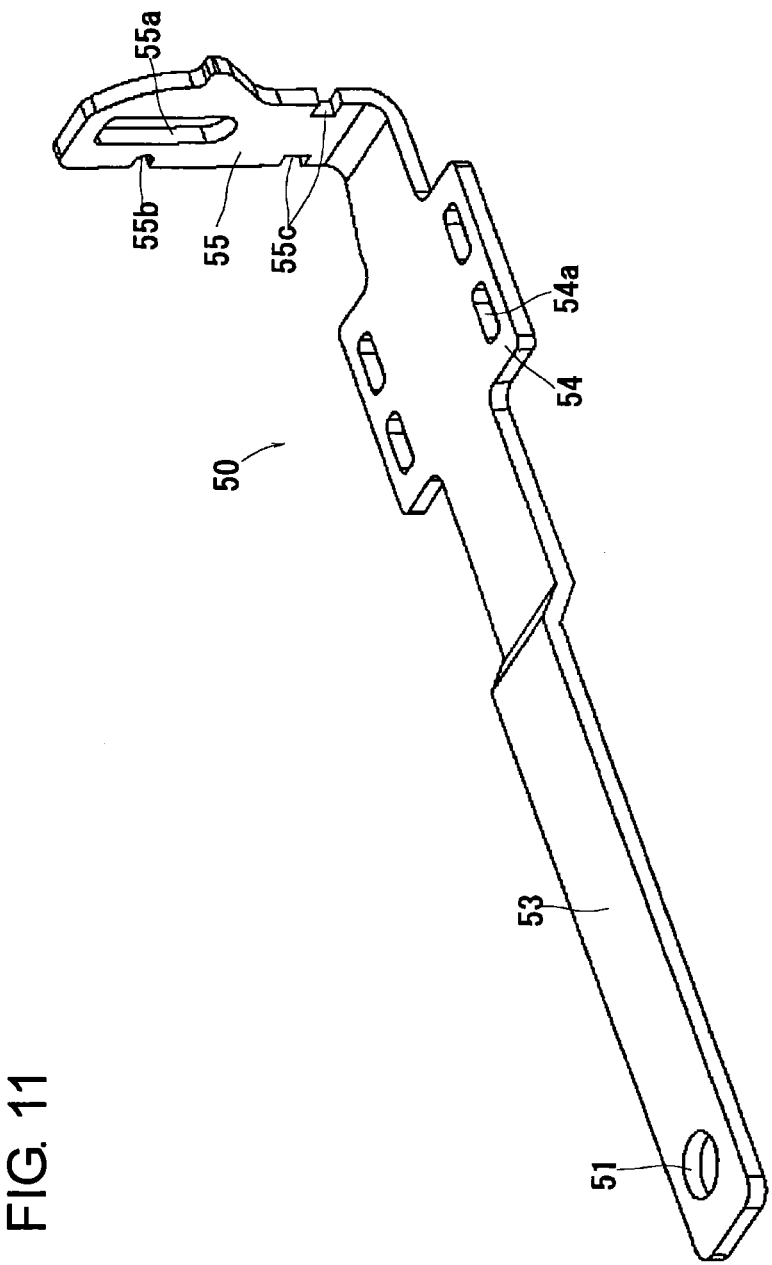
FIG. 11 is a perspective view showing a second modified form of the lock member of the seat sliding device for the vehicle in FIG. 2.

FIG. 11 is a view showing a modified form of the mounting portion 55 of the lock member 50. The mounting portion 55 is formed with the aforementioned elongate hole 55a and the cutout 55b, and further, a lower part of the mounting portion 55 is formed at both side portions thereof with cutouts 55c which enable the narrowing portions 47a, 47b of the mounting-portion piercing opening 47 shown in FIG. 7(A) to come thereinto. As mentioned earlier, when the mounting-portion piercing opening 47 of the upper rail 40 with the mounting portion 55 of the lock member 50 passing therethrough moves forward with the relative movement of the upper rail 40 relative to the lock member 50, the narrowing portions 47a, 47b of the mounting-portion piercing opening 47 move as they come into the cutouts 55c of the mounting portion 55. In the case of the mounting portion 55 which is not formed with the cutouts 55c, the narrowing portions 47a, 47b of the mounting-portion piercing opening 47 may move while held in contact with and thus cut by the both side portions of the mounting portion 55. However, since the provision of the cutouts 55c makes it possible for the narrowing portions 47a, 47b to come thereinto only without being cut, it results that the cutouts 55c are made to contact the narrowing portions 47a, 47b, so that the downward movement of the mounting portion 55 can be prevented further reliably.

Figure 12A:
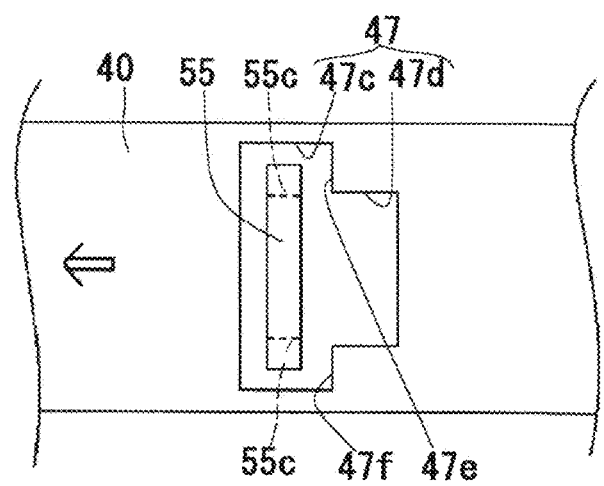
FIG. 12(A) is a view showing the state before the deformation of a modified form of the mounting-portion piercing opening formed on the upper rail of the sliding device for the vehicle in FIG. 2, and [FIG. 12(B)] is a view showing the state after the deformation of the mounting-portion piercing opening.

FIG. 12(A) is a view showing a modified form of the movement restraining portion formed at the mounting-portion piercing opening 47 of the upper rail 40 and is the view showing the movement restraining portion which is adapted to the mounting portion 55 formed with the cutouts 55c shown in FIG. 11. The mounting-portion piercing opening 47 has a large rectangular shape portion 47c that has a wider width than the width of the mounting portion 55 in the direction orthogonal to the rail axis direction so that the mounting portion 55 of the lock member 50 does not contact the opening edge portion, and a small rectangular shape portion 47d that is formed to communicate with a rear center of the large rectangular shape portion 47c and that has a slightly wider width than the distance between the cutouts 55c of the mounting portion 55. That is, at the both rear side portions of the mounting-portion piercing opening 47, there are formed stepped portions 47e, 47f (corresponding to "movement restraining portion" in the present invention) which narrow the width of the mounting-portion piercing opening 47 so as to be able to come into the cutouts 55c of the mounting portion 55 at the time of relative movement between the lock member 50 and the upper rail 40.

Figure 12B:
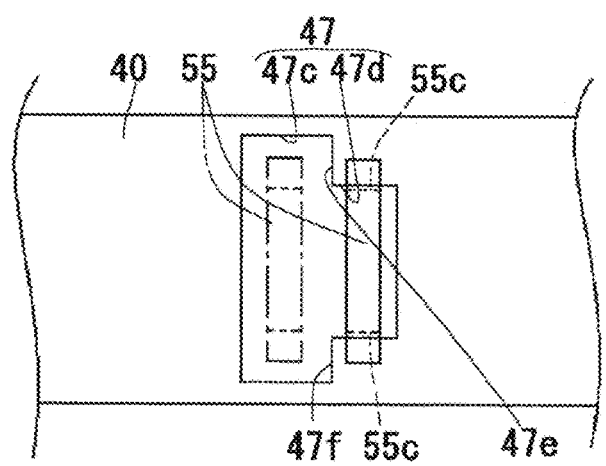

When the mounting-portion piercing opening 47 of the upper rail 40 with the mounting portion 55 of the lock member 50 passing therethrough moves forward as shown in FIG. 12(B) with the relative movement of the upper rail 40 relative to the lock member 50 as mentioned earlier, the stepped portions 47e, 47f of the mounting-portion piercing opening 47 move as they come into the cutouts 55c of the mounting portion 55. In this way, by the provision of the cutouts 55c, it results that the stepped portions 47e, 47f come into the cutouts 55c without being cut and come into contact with the cutouts 55c, so that the engaging portion 54 is held in the state of being engaged with the engaged portions 35 of the lower rail 30. That is, the lock member 50 is restrained from moving in the lock release direction and can further stably maintain the state that the relative movement between the lower rail 30 and the upper rail 40 has been locked against an inputted large load in the vehicle forward direction. Further, the elongate holes 54a at the engaging portion 54 of the lock member 50 are held engaged to reach the roots of the cutouts 35a of the engaged portions 35 of the lower rail 30, in which the breakage mode in the aforementioned load becomes pure shear, so that a stable lock strength can be ensured.

Although in the sliding device 1 for the vehicle in the foregoing embodiment, the movement permitting portion is formed at the attached portion 46 of the upper rail 40, a movement permitting portion of the same shape may be formed at the attaching portion 51 of the lock member 50. In this case, unlike the movement permitting portion at the attached portion 46 which is formed on the rearward side of the attaching hole 46a with the attaching pin 52 passing therethrough, the movement permitting portion at the attaching portion 51 is formed on the forward side of the attaching hole 46a with the attaching pin 52 passing therethrough. Regarding the movement permitting portion at the attached portion 46 and the movement permitting portion at the attaching portion 51, either one of them may be formed or both of them may be formed. Although the present invention is applied to the sliding device 1 for the vehicle of the type that the lock member 50 moves vertically relative to the rail axis to perform the lock and the lock release, the present invention may also be applicable to a sliding device for a vehicle of the type that the lock member turns about the rail axis to perform the lock and the lock release. Further, although description has been made in the case that the sliding device is applied to a seat of the vehicle, the sliding device may be applicable to one for a vehicle that is required to slide.

Various features and many of the attendant advantages in the foregoing embodiment and the modified forms thereof will be summarized as follows:

In the sliding device for the vehicle according to the foregoing embodiment and the modified forms thereof typically shown in FIGS. 3, 5(A)-5(B), 6(A)-6(C), 7(A)-7(B), 9, 10(A)-10(C), 11 and 12, when a frontal collision encountered with the lock member 50 locking the relative movement between the first and second (lower and upper rails) 30, 40 causes a large load to be inputted to one of the first and second rails 40 in the vehicle forward direction, the lock member 50 first relatively moves at the movement permitting portion 46b-46i, 56 relative to the rail 40 attaching the lock member 50 in the rail axis direction. Then, the lock member 50 is restrained at the movement restraining portion 47a, 47b, 47e, 47f, 49a from moving in the lock release direction. Therefore, it can be realized to stably maintain the state that the relative movement between the first and second rails 30, 40 is locked against the inputted large load in the vehicle forward direction.

Also in the sliding device for the vehicle according to the foregoing embodiment and the modified forms thereof typically shown in FIGS. 3, 5(A)-5(B), 6(A)-6(C) and 10(A)-10(C), since the movement permitting portion 46b-46i is formed at at least one of the attaching portion 51 formed on the lock member 50 and the attached portion 46 formed on the rail 40 attaching the lock member 50, the lock member 50 relatively moves at the movement permitting portion 46b-46i relative to the rail 40 attaching the lock member 50 in the rail axis direction when the large load in the vehicle forward direction is inputted. Further, since the movement restraining portion 49a is formed at the engaging-portion piercing opening 49 through which the engaging portion 54 formed on the lock member 50 passes, the engaging portion 54 comes into engagement with the movement restraining portion 49a to be restrained from moving in the direction separating from the engaged portion 35 when the lock member 50 makes the aforementioned relative movement. That is, the lock member 50 is restrained from moving in the lock release direction.

Also in the sliding device for the vehicle according to the foregoing embodiment and the modified forms thereof typically shown in FIGS. 3, 5(A)-5(B), 7(A)-7(B), 10(A)-10(C), 11 and 12(A)-12(B), since the movement permitting portion 46b-46i is formed at at least one of the attaching portion 51 formed on the lock member 50 and the attached portion 46 formed on the rail 40 attaching the lock member 50, the lock member 50 relatively moves at the movement permitting portion 46b-46i relative to the rail 40 attaching the lock member 50 in the rail axis direction when the large load in the vehicle forward direction is inputted. Further, since the movement restraining portion 47a, 47b, 47d, 47f is formed at the mounting-portion piercing opening 47 through which the mounting portion 55 formed on the lock member 50 passes, the mounting portion 55 comes into engagement with the movement restraining portion 47a, 47b, 47d, 47f when the lock member 50 makes the aforementioned relative movement, whereby the engaging portion 54 formed on the lock member 50 is restrained from moving in the direction separating from the engaged portion 35. That is, the lock member 50 is restrained from moving in the lock release direction.

Also in the sliding device for the vehicle according to the foregoing embodiment and the modified forms thereof typically shown in FIGS. 3, 6(A)-6(C), 8 and 9(A)-9(B), the lock member 50 is formed with the attaching portion 51 attached to one of the first and second rails 40 and the engaging portion 54 engaged with the other of the first and second rails 30. Further, since the movement permitting portion 56 is formed between the attaching portion 51 and the engaging portion 54 on the body portion 53 of the lock member 50, when the large load in the vehicle forward direction is inputted, the body portion 53 of the lock member 50 is drawn between the attaching portion 51 and the engaging portion 54, and the movement permitting portion 56 formed therebetween is deformed in the rail axis direction. That is, the lock member 50 relatively moves in the rail axis direction relative to the rail 40 attaching the lock member 50. Further, since the movement restraining portion 49a is formed at the engaging-portion piercing opening 49 through which the engaging portion 54 of the lock member 50 passes, when the lock member 50 makes the aforementioned relative movement, the engaging portion 54 comes into engagement with the movement restraining portion 49a and is restrained from moving in the direction separating from the engaged portion 35. That is, the lock member 50 is restrained from moving in the lock release direction.

Also in the sliding device for the vehicle according to the foregoing embodiment and the modified form thereof typically shown in FIGS. 3, 7(A)-7(B), 8 and 9(A)-9(B), the lock member 50 is formed with the attaching portion 51 attached to one of the first and second rails 40 and the engaging portion 54 engaged with the other of the first and second rails 30. Further, since the movement permitting portion 56 is formed between the attaching portion 51 and the engaging portion 54 on the body portion 53 of the lock member 50, when the large load in the vehicle forward direction is inputted, the body portion 53 of the lock member 50 is drawn between the attaching portion 51 and the engaging portion 54, and the movement permitting portion 56 formed therebetween is deformed in the rail axis direction. That is, the lock member 50 relatively moves relative to the rail 40 attaching the lock member 50 in the rail axis direction. Further, since the movement restraining portion 47a, 47b is formed at the mounting-portion piercing opening 47 through which the mounting portion 55 formed on the lock member 50 passes, when the lock member 50 makes the aforementioned relative movement, the mounting portion 55 comes into engagement with the movement restraining portion 47a, 47b, whereby the engaging portion 54 of the lock member 50 is restrained from moving in the direction separating from the engaged portion 53. That is, the lock member 50 is restrained from moving in the lock release direction.

Also in the sliding device for the vehicle according to the foregoing embodiment and the modified forms thereof typically shown in FIGS. 3, 8 and 9(A)-9(B), the technique capable of stably maintaining the state that the relative movement between the upper rail 40 and the lower rail 30 is locked against the inputted large load in the vehicle forward direction is applied to the sliding device for the vehicle in which the lock member 50 vertically moves to perform the lock and the lock release. The sliding device 1 for the vehicle features that it is few in the number of parts in comparison with a sliding device for a vehicle in which a lock member turns about a rail axis to perform the lock and the lock release, and hence, can be reduced in the cost for the device.

INDUSTRIAL APPLICABILITY

The sliding device for the vehicle according to the present invention is suitable for use in a sliding device for a vehicle that is provided with a pair or first rails fixed to a vehicle and a pair of second rails supported slidably relative to the first rails and that supports a seat of a vehicle movably in a front-rear direction.

The invention claimed is:
1. A sliding device for a vehicle, comprising:
a first rail;
a second rail supported relatively movably relative to the first rail in a rail axis direction;
a lock member received and attached within a section area of one of the first and second rails to extend in the rail axis direction of the one rail for locking the relative movement between the first and second rails, the lock member including a pin;

a manipulation lever mounted to the lock member for moving the lock member to permit the relative movement between the first and second rails;
a movement permitting portion formed on at least one of the lock member and the rail attaching the lock member so that the relative movement between the lock member and the rail attaching the lock member in the rail axis direction is allowed with the lock member locking the relative movement, the pin being able to pass through the movement permitting portion; and
a movement restraining portion formed on the rail attaching the lock member to restrain the movement in a lock release direction of the lock member after the relative movement at the movement permitting portion,
wherein the movement permitting portion includes a first portion with a diameter greater than an outer diameter of the pin and a second portion with a diameter less than the pin.

2. The sliding device for the vehicle in claim 1, wherein:
the lock member is formed with an attaching portion attachable to one of the first and second rails and an engaging portion engageable with the other of the first and second rails;
one of the first and second rails is formed with an attached portion to which the attaching portion is attached, and an engaging-portion piercing opening through which the engaging portion passes;
the other of the first and second rails is formed with an engaged portion engageable with the engaging portion protruding from the engaging-portion piercing opening;
the movement permitting portion is formed at at least one of the attaching portion and the attached portion; and
the movement restraining portion is formed at the engaging-portion piercing opening so that when the lock member and the rail attaching the lock member move relatively, the engaging portion comes into engagement to be restrained from moving in a direction separating from the engaged portion.

3. The sliding device for the vehicle in claim 1, wherein:
the lock member is formed with an attaching portion attachable to one of the first and second rails, an engaging portion engageable with the other of the first and second rails, and a mounting portion mounting the manipulation lever;
one of the first and second rails is formed with an attached portion to which the attaching portion is attached, and a mounting-portion piercing opening through which the mounting portion passes;
the other of the first and second rails is formed with an engaged portion engageable with the engaging portion;
the movement permitting portion is formed at least one of the attaching portion and the attached portion; and
the movement restraining portion is formed at the mounting-portion piercing opening so that when the lock member and the rail attaching the lock member move relatively, the mounting portion comes into engagement to restrain the engaging portion from moving in a direction separating from the engaged portion.

4. The sliding device for the vehicle in claim 1, wherein:
the lock member is formed with an attaching portion attachable to one of the first and second rails and an engaging portion engageable with the other of the first and second rails;
one of the first and second rails is formed with an attached portion to which the attaching portion is attached, and an engaging-portion piercing opening through which the engaging portion passes;
the other of the first and second rails is formed with an engaged portion engageable with the engaging portion protruding from the engaging-portion piercing opening;
the movement permitting portion is formed between the attaching portion and the engaging portion on a body portion of the lock member; and
the movement restraining portion is formed at the engaging-portion piercing opening so that when the lock member and the rail attaching the lock member move relatively, the engaging portion comes into engagement to be restrained from moving in a direction separating from the engaged portion.

5. The sliding device for the vehicle in claim 1, wherein:
the lock member is formed with an attaching portion attachable to one of the first and second rails, an engaging portion engageable with the other of the first and second rails, and a mounting portion mounting the manipulation lever;
one of the first and second rails is formed with an attached portion to which the attaching portion is attached, and a mounting-portion piercing opening through which the mounting portion passes;
the other of the first and second rails is formed with an engaged portion engageable with the engaging portion;
the movement permitting portion is formed between the attaching portion and the engaging portion on a body portion of the lock member; and
the movement restraining portion is formed at the mounting-portion piercing opening so that when the lock member and the rail attaching the lock member move relatively, the mounting portion comes into engagement to restrain the engaging portion from moving in a direction separating from the engaged portion.

6. The sliding device for the vehicle in claim 1, wherein:
the first rail is a lower rail fixed to a floor of the vehicle;
the second rail is an upper rail fixed to a sheet of the vehicle; and
the lock member is attached to the upper rail for locking the relative movement between the upper rail and the lower rail when moved upward.

7. The sliding device for the vehicle in claim 1, wherein:
the movement permitting portion comprises a portion that is formed on the at least one of the lock member and the rail attaching the lock member and that is deformed to permit the relative movement between the lock member and the rail attaching the lock member when a frontal collision encountered with the lock member locking the relative movement between the first and second rails causes a large load in a vehicle forward direction to be inputted to the rail attaching the lock member.

8. The sliding device for the vehicle in claim 1, wherein:
the movement restraining portion comprises a portion that is formed on the rail attaching the lock member to be engaged with the lock member and to restrict the lock member from moving in a direction that brings about a separation of the engaging portion from the engaged portion when the lock member and the rail attaching lock member moves relatively.

9. The sliding device for the vehicle in claim 2, wherein:
the movement permitting portion comprises a portion that is formed on the attached portion to be deformed when the lock member and the rail attaching the lock member move relatively; and
the movement restraining portion comprises an oblique portion that is formed on the engaging-portion piercing opening to be engaged with the engaging portion of the lock member when the lock member and the rail attaching the lock member move relatively.

10. The sliding device for the vehicle in claim 3, wherein:
the movement permitting portion comprises a portion that is formed on the attached portion to be deformed by the pin when the lock member and the rail attaching the lock member move relatively; and
the movement restraining portion comprises a narrowed portion of the mounting-portion piercing opening that is narrowed in width in a direction orthogonal to the rail axis direction so that the narrowed portion is engaged with the mounting portion of the lock member when the lock member and the rail attaching the lock member moves relatively.

11. The sliding device for the vehicle in claim 4, wherein:
the movement restraining portion comprises an oblique portion that is formed on the engaging-portion piercing opening to be engaged with the engaging portion of the lock member when the lock member and the rail attaching the lock member move relatively.

12. The sliding device for the vehicle in claim 5, wherein:
the movement restraining portion comprises a narrowed portion of the mounting-portion piercing opening that is narrowed in width in a direction orthogonal to the rail axis direction so that the narrowed portion is engaged with the mounting portion of the lock member when the lock member and the rail attaching the lock member moves relatively.

13. The sliding device for the vehicle in claim 1, wherein the second portion is deformed by the pin when the lock member and the rail attaching the lock member move relatively at a predetermined load.

* * * * *